United States Patent
Tokar (10) Patent No.: US 12,079,848 B2
(45) Date of Patent: Sep. 3, 2024

(54) SPECIALTY GOODS PRICE EVALUATION USING SOCIAL NETWORKS-BASED PRODUCERS REPRESENTATION

(71) Applicant: WONDEREUR INC., Toronto (CA)

(72) Inventor: Tomas Tokar, Calgary (CA)

(73) Assignee: WONDEREUR INC., Toronto (CA)

(*) Notice: Subject to any disclaimer, the term of this patent is extended or adjusted under 35 U.S.C. 154(b) by 137 days.

(21) Appl. No.: 17/734,911

(22) Filed: May 2, 2022

(65) Prior Publication Data
US 2022/0351257 A1  Nov. 3, 2022

Related U.S. Application Data

(60) Provisional application No. 63/182,556, filed on Apr. 30, 2021.

(51) Int. Cl.
*G06Q 30/06* (2023.01)
*G06Q 30/0283* (2023.01)
(Continued)

(52) U.S. Cl.
CPC ..... *G06Q 30/0283* (2013.01); *G06Q 30/0627* (2013.01); *G06Q 50/01* (2013.01)

(58) Field of Classification Search
CPC ........... G06Q 30/0283; G06Q 30/0623; G06Q 30/0601; G06Q 50/01
(Continued)

(56) References Cited

U.S. PATENT DOCUMENTS

2008/0275861 A1* 11/2008 Baluja ................ G06Q 30/0274
707/999.005
2012/0150854 A1*  6/2012 Song ................... G06F 16/9558
707/E17.119
(Continued)

FOREIGN PATENT DOCUMENTS

KR          20190124170 A      11/2019
KR          102051077 B1 * 12/2019 ......... G06Q 30/0283
(Continued)

OTHER PUBLICATIONS

Davich, Jerry ; Art and opportunity merge into new 'Artunity' app; . Tribune Publishing Company, LLC. Copyright Tribune Interactive, LLC May 18, 2017; retrieved from Dialog on Feb. 9, 2023 (Year: 2017).*

(Continued)

*Primary Examiner* — Yogesh C Garg
(74) *Attorney, Agent, or Firm* — Sterne, Kessler, Goldstein & Fox P.L.L.C.

(57) ABSTRACT

Disclosed herein are system, method, and computer program product embodiments for a method of evaluating specialty goods. The method receives data representing a graph specifying relationships between producers and institutions. Based on the relationships specified in the graph and a first set of weights, the method determines a convolution value for a producer such that the convolution value inherits attributes of institutions for which the producer has a relationship. The method receives data describing a specialty good from a producer and inputs the convolution value and the data describing the specialty good into a machine learning module with a second set of weights. The first set of weights and the second set of weights are trained from known evaluations of specialty goods of the producer. From (Continued)

the machine learning module, the method receives a value of the specialty good.

17 Claims, 5 Drawing Sheets

(51) Int. Cl.
*G06Q 30/0601* (2023.01)
*G06Q 50/00* (2012.01)

(58) Field of Classification Search
USPC ........................................................ 705/26.63
See application file for complete search history.

(56) References Cited

U.S. PATENT DOCUMENTS

| 2012/0191531 | A1* | 7/2012 | You ........................ G06F 16/958 |
| | | | 705/14.42 |
| 2018/0150785 | A1 | 5/2018 | Wang et al. |
| 2022/0398340 | A1* | 12/2022 | Jakobsson ............. G06F 21/602 |

FOREIGN PATENT DOCUMENTS

| KR | 20200058763 A * | 5/2020 | ............ G06Q 50/10 |
| WO | WO 2019246341 A1 | 12/2019 | |

OTHER PUBLICATIONS

International Search Report and the Written Opinion of the International Searching Authority for International Application No. PCT/IB2022/054054 mailed Aug. 9, 2022, 7 pages.

* cited by examiner

SPECIALTY GOODS PRICE EVALUATION USING SOCIAL NETWORKS-BASED PRODUCERS REPRESENTATION

FIELD

The present disclosure relates to a method for evaluating specialty goods, such as artworks, jewelry and luxury clothing.

BACKGROUND

Prices of specialty goods are difficult to evaluate. This is because an item's price depends greatly on the cultural acclaim of the producer. Moreover, each item is unique and typically produced in a very small number of copies or in a single copy only, as is the case with artworks. Therefore, a reference price for specialty goods is difficult to establish.

Price evaluation of specialty goods is performed by specialized experts—appraisers. Appraisals require extensive expertise, are lengthy and expensive, may be biased based on personal biases of the appraiser and may bear a certain degree of ambiguity. Furthermore, price evaluation of specialty goods often requires extensive data that may be unavailable, such as the case of a new artist without prior price records to serve as reference in determining a price estimate of that artist's specialty good. To reduce the costs of evaluations, to mitigate disadvantages of human appraisal such as bias and ambiguity, and to avoid the need for extensive data that may be unavailable, computational tools to automate the price evaluation process of specialty goods are needed.

BRIEF SUMMARY

Disclosed herein are system, apparatus, device, method and/or computer program product embodiments, and/or combinations and sub-combinations thereof for evaluating specialty goods. In particular, a method for evaluating specialty goods uses social interactions of a producer with institutions or other producers to derive an acclaim level of the producer. The acclaim level of the producer is then used to obtain a price estimate of a specialty good of the producer, such as an artwork, jewelry, luxury clothing, etc. The method allows the price estimate of the specialty good to be obtained even if prior price records are not available for the producer.

In some embodiments, a method for evaluating specialty goods includes gathering data representing a plurality of nodes and a plurality of events. Each node in the plurality of nodes includes at least one attribute that defines each node. Each event in the plurality of events defines a relationship between two nodes in the plurality of nodes. The method may generate a social network graph specifying the relationship between each node in the plurality of nodes as defined by the plurality of events. Based on the relationship specified in the social network graph and a first set of weights, the method may determine a hidden state value for each node of the plurality of nodes such that the hidden state value for a specific node in the plurality of nodes inherits the at least one attribute of any node in the plurality of nodes that interacts with the specific node through an event in the plurality of events. The method may further receive data describing a specialty good associated with the specific node in the plurality of nodes and input the hidden state value for the specific node in the plurality of nodes and the data describing the specialty good into a machine learning module having a second set of weights. Using the machine learning module and the second set of weights, the method may generate a price estimate for the specialty good. The first set of weights and the second set of weights may be trained based on an actual price for the specialty good for a plurality of specialty goods.

In some examples, the method may determine the hidden state value for each node of the plurality of nodes by applying the first set of weights to the at least one attribute defining each node to determine a convolution value at each iteration of a plurality of convolution iterations. The method may input the hidden state value for the specific node in the plurality of nodes and the data describing the specialty good into the machine learning module by representing the hidden state value for the specific node and the data describing the specialty good as a plurality of tensors and concatenating the plurality of tensors into an input tensor. The price estimate for the specialty good may be generated by applying the second set of weights to the input tensor at each layer of a plurality of layers in the machine learning module.

In some examples, the method may further compare a difference between the price estimate generated using the machine learning module to the actual price for the specialty good and train the first set of weights and the second set of weights using the comparison. To train the first set of weights and the second set of weights, the method may back-propagate the difference between the price estimate and the actual price through each layer of the plurality of layers in the machine learning module and through each iteration of the plurality of convolution iterations. The first set of weights may be adjusted at each iteration of the plurality of convolution iterations and the second set of weights may be adjusted at each layer of the plurality of layers in the machine learning module such that the difference between the price estimate and the actual price for the specialty good is decreased. Furthermore, the method may back-propagate the difference between the price estimate and the actual price directly to a specific layer in the plurality of layers in the machine learning module or a specified iteration of the plurality of convolution iterations to decrease a vanishing gradient during the training process of the first and second set of weights.

In another embodiment, a system for evaluating specialty goods includes a memory for storing instructions and one or more processors, communicatively coupled to the memory, configured to execute the instructions. The instructions cause the one or more processors to gather data representing a plurality of nodes and a plurality of events. Each node in the plurality of nodes includes at least one attribute that defines each node. Each event in the plurality of events defines a relationship between two nodes in the plurality of nodes. The processor may generate a social network graph specifying the relationship between each node in the plurality of nodes as defined by the plurality of events. Based on the relationship specified in the social network graph and a first set of weights, the processor may determine a hidden state value for each node of the plurality of nodes such that the hidden state value for a specific node in the plurality of nodes inherits the at least one attribute of any node in the plurality of nodes that interacts with the specific node through an event in the plurality of events. The processor may further receive data describing a specialty good associated with the specific node in the plurality of nodes and input the hidden state value for the specific node in the plurality of nodes and the data describing the specialty good into a machine learning module having a second set of weights. Using the machine learning module and the second set of weights, the processor may generate a price estimate for the specialty good. The first set of weights and the second set of weights may be trained based on an actual price for the specialty good for a plurality of specialty goods.

In yet another embodiment, a method for evaluating specialty goods includes receiving data representing a graph specifying relationships between a plurality of producers and a plurality of institutions. Based on the relationships specified in the graph and a first set of weights, the method may determine a convolution value for a producer such that the convolution value inherits attributes of institutions in the plurality of institutions for which the producer has a relationship. The method may further receive data describing a specialty good from a producer of the plurality of producers and input the convolution value and the data describing the specialty good into a machine learning module with a second set of weights. The first set of weights and the second set of weights may be trained from known evaluations of specialty goods of the plurality of producers. From the machine learning module, the method may receive a value of the specialty good.

Descriptions provided in the summary section represent only examples of the embodiments. Other embodiments in the disclosure may provide varying scopes different from the description in the summary.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Current methods for computational art appraisal fail to capture a producer's cultural acclaim. Instead, these methods treat the producer as any other categorical characteristics of the item (e.g., material, color). To accommodate the categorical variables, such as a producer or an item's material, each category is assigned a vector that is processed to estimate the price. This is currently done by categorical encoding, where a fixed vector is assigned to each category using some prescribed logic. Dimension of the vectors representing categories of the given variable grows linearly with the number of categories of the given variable.

Tools can then be applied only to products whose categorical characteristics have been assigned their encoding vector when the tool was developed. Each tool can only be applied to items produced by existing producers and cannot be used beyond the scope of the producers for which the tools were originally developed.

Extending the scope of these tools requires adding records containing characteristics of the products made by producers and the products' associated prices. This is not possible for the producers who have no prior sale records (e.g. emerging artists, new brands, etc.) or if the price records are not available for other reasons. This imposes a fundamental challenge for computational appraisal of specialty goods.

Even if price records are available, extending the scope of the currently used tools requires the tools to be recalibrated (refitted, or retrained) using the extended records. In most cases, computational complexity of this process grows with the square of the dimension of the encoding vectors (i.e., with the square of the scope size, such as the number of artists or brands to be covered). In some cases, the computational complexity grows with the third power of the dimension of the encoding vectors. This imposes important technical challenges, causing currently used computational appraisal tools to be applicable for only a very narrow set of producers.

In order to overcome the above-described challenges, the method of the present disclosure leverages the social interactions of the producer to derive mathematical representations that embed the producers' cultural acclaim. While still requiring some product price records, the method allows evaluation of the price of a product even if price records of the product made by a given producer are not available.

Information about the producers' social interactions with other market stakeholders and information about the producers' cultural affiliations are arranged into a social network graph. Vertices (nodes) of this graph represent producers, related stakeholders, or abstract terms referring to cultural characteristics of the producers. Edges of this graph represent social interactions between producers and other stakeholders or cultural affiliations of the producers.

A collection of records on physical characteristics of products, such as size and material, along with the associated prices and market characteristics are prepared. Market characteristics may be data point(s) describing the circumstances surrounding the associated price, such as a type of the market where the product was sold (e.g., auction vs retail, etc.).

A computational model, such as graph neural network, is designed so that the network assigns each vertex representing the producer to a unique low dimensional vector, which is passed to a price estimator. The low dimensional vector represents the producer as a point in N dimensional space such that vectors representing two producers with similar social connections lie within close proximity from each other. Having lower dimensionality may make embodiments of the present disclosure more computationally efficient.

Another computational model, such as feedforward neural network, is designed to serve as a price estimator. The network is designed to accept as input vectors representing producers and the market characteristics of the product and returns as output the product price estimate.

For all price records, a price estimate is generated using the price estimator. From the difference between the estimate and actual price, a loss is calculated using some of the commonly used loss functions (e.g., mean squared error). Loss is used to adjust the parameters of the price estimator as well as the assigned vector representations. The price estimator is trained using backpropagation methods. This is repeated until all the parameters are optimized so that the estimates approximate the actual price records sufficiently.

Vector representations of producers are extracted from the model and stored. Vectors are stored in a way that allows 1-to-1 mapping between the producer and the associated representation vector. The price estimator and the producer representation vectors constitute modules of the tool for computational valuation of the products.

Therefore, the computational specialty goods valuation method of the present disclosure can estimate a product price using the following steps. First, the product's physical characteristics, the product's market characteristics, and the product's producer serve as inputs received by the tool. Second, the tool selects the representation vector associated with the given producer. Third, the representation vector along other inputs are then passed to the price estimator module. Fourth, the price estimator module returns the estimate of the product price. Fifth, the obtained price estimate can be further post-processed (e.g., the price estimate may be converted to a different currency or adjusted for inflation).

The following is an example of utilizing the method of the present disclosure as a tool for fine-art artworks appraisal.

First, information about the social interaction of artists is arranged into a social network graph. Vertices of this graph represent artists, art institutions (e.g., galleries, museums), and abstract terms, such as art movements. Edges of the graph represent interactions between vertices, such as artist exhibitions in a given gallery, acquisitions by a given museum, artists' affiliations with the art movements, or artists' mentions in media.

Second, a computational model, such as a graph neural network, is designed to assign each artist a low-dimensional vector such that artists with similar social interactions (e.g., artists exhibiting in the same galleries, artists belonging to the same art movement, etc.), are assigned vectors which lie within a close proximity from each other in the vector space.

Third, a collection of records on physical characteristics of the artwork, such as the artwork's height, width, medium (e.g., painting or sculpture), and material, and the artwork's associated prices and market characteristics (e.g. primary market vs auction market) are prepared.

Fourth, another computational model (i.e., a price estimator) is designed to accept inputs of vectors representing the artist and the artwork's physical and market characteristics. The price estimator returns the artwork price estimate as output.

The price estimator generates a price estimate for all artworks having a price record. The difference between the estimated and actual artwork price is used to calculate loss, which is used to adjust the parameters of the price estimator as well as the assigned artists' vectors. This adjustment process is repeated until all the parameters are optimized so that the price estimates approximate the actual price records sufficiently.

Embodiments described herein are directed to a new method for evaluating specialty goods based on an acclaim level of the specialty good's producer obtained through social interactions with institutions and other producers in a social network. The method allows for more accurate price estimation of specialty goods by producers with incomplete data or nonexistent data of prior price records for sales of similar specialty goods. The method generates a social network graph illustrating relationships between producers and institutions that affect the social value and/or social acclaim of interacting producers and institutions. By using the social network graph to generate price estimates of specialty goods based on the ever-changing social value and/or social acclaim of the producer, the method may accommodate new data of price records without needing recalibration or retraining, thus reducing computational costs. Furthermore, the method may allow comparisons of producers and/or institutions based on a proximate location in the social network graph. This allows purchasers to determine similarities and/or dissimilarities between artistic styles of producers on the social network graph so that a purchaser may buy a "similar" specialty goods by a different producer when a specific specialty good by a specific producer is not available on the market.

Figure 1:
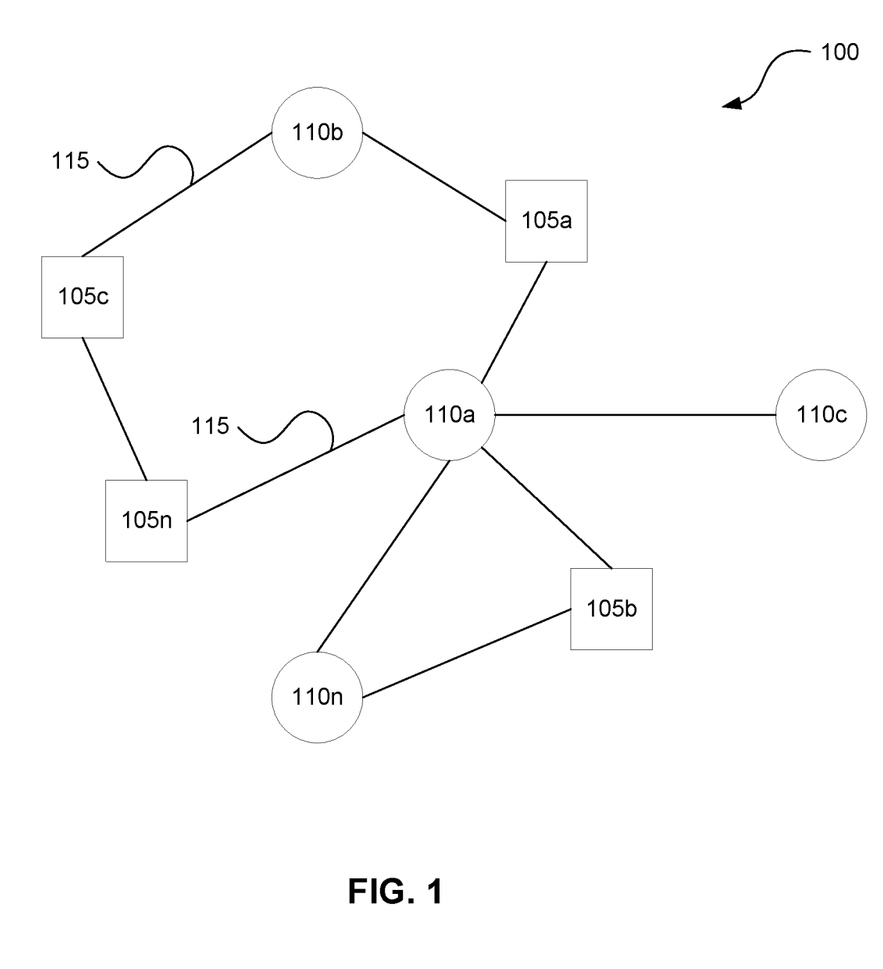
FIG. 1 shows a social network graph illustrating relationships between producers and institutions according to an embodiment of the present disclosure.

FIG. 1 shows a social network graph 100 according to an exemplary embodiment of the present disclosure. Social network graph 100 includes nodes linked through events signifying relationships between the nodes. In some embodiments, the nodes forming social network graph 100 may include producers 105 and institutions 110. For example, producers 105 may be artists and institutions 110 may be art galleries, museums, auction houses, etc. When a producer 105 interacts with an institution 110 through an event (e.g., when an artist shows artwork at an art gallery), a relationship 115 is formed, connecting that producer 105 and that institution 110 in social network graph 100. In some embodiments (not depicted), multiple producers 105 may form relationships 115 with a single institution 110, and multiple institutions 110 may form relationships 115 with a single producer 105. It should be understood by those skilled in the art that social network graph 100 may include any number 105a-105n of producers 105 and any number 110a-110n of institutions 110. Furthermore, social network graph 100 may include relationships 115 between two producers 105, two institutions 110, and a producer 105 and an institution 110. For example, as shown in the embodiment of FIG. 1, social network graph 100 depicts producer 105a having a relationship 115 with institution 110a, producer 105c having a relationship 115 with another producer 105n, and institution 110a having a relationship 115 with another institution 110c. It should be understood that the configuration of social network graph 100 depicted in FIG. 1 is for illustrative purposes only and not intended to be exhaustive or limiting on the teachings of the present disclosure.

Each producer 105 in social network graph 100 has at least one attribute that defines the producer 105. Likewise, each institution 110 in social network graph 100 has at least one attribute that defines the institution 110. In some embodiments, the attribute of each producer 105 and each institution 110 is a randomly assigned identification number. When a producer 105 interacts with an institution 110 to form a relationship 115, a hidden state value of the producer 105 inherits the attribute of the institution 110 such that the social acclaim of the producer 105 is affected by the relationship 115 with the institution 110. For example, a producer 105 who is a new artist may form a relationship 115 with a well-known institution 110 that is an art gallery when the artist displays an artwork at the art gallery. In this scenario, the new artist may not have much social acclaim initially, but through the interaction with a well-acclaimed art gallery, the new artist's hidden state value may inherit the attribute of the well-acclaimed art gallery, thus increasing the social acclaim and/or social value of the new artist. Likewise, the hidden state value of institutions 110 may also be affected through forming relationships 115 with various producers 105. For example, an art gallery that frequently promotes artists who progress to become more well-known in the art community will increase its hidden state value, thus signifying an increase in that art gallery's social acclaim and/or social value, which will in turn affect other artists in future interactions. In some embodiments, the hidden state value is an embedded vector. Each producer 105 and institution 110 may be assigned an initial embedded vector. With each relationship 115 formed between producer 105 and institution 110, the hidden state value of the interacting producer 105 and institution 110 are affected through multiple convolution iterations of the embedded vector, as explained in further detail below with reference to FIG. 2. This method of updating the hidden state value of producers 105 and institutions 110 after forming relationships 115 in social network graph 100 allows the social value of producers 105 to be known, even if the producer 105 does not have a prior history or record of artwork sales.

Figure 2:
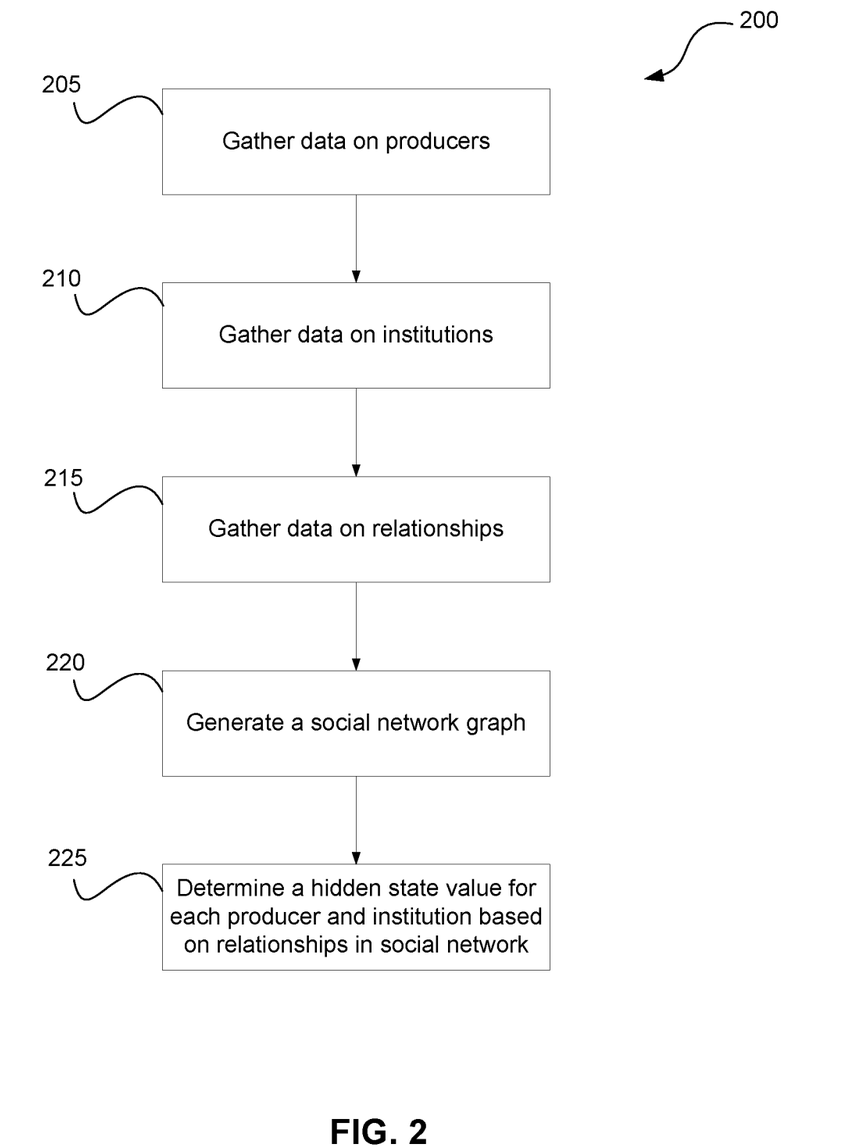
FIG. 2 shows a flowchart illustrating a method for determining a hidden state value for producers and institutions of the social network graph depicted in FIG. 1, according to an embodiment of the present disclosure.

An exemplary method for determining the hidden state value for each producer 105 and institution 110 based on social network graph 100 will now be described with reference to FIG. 2. FIG. 2 shows a flowchart illustrating a method 200 for determining the hidden state value for producers 105 and institutions 110 of the social network graph 100 depicted in FIG. 1, according to an embodiment of the present disclosure. Some operations of method 200 may be performed in a different order and/or vary, and method 200 may include more operations that are not described herein for simplicity.

Referring to FIG. 2, at steps 205-210, method 200 gathers data on producers 105 (step 205) and gathers data on institutions 110 (step 210). For example, in some embodiments, method 200 may use natural language processing to search for names of producers 105 and institutions 110 across various sources and databases. Furthermore, method 200 may use jaro-winkler distance analysis to determine a distance between similar strings. This allows method 200 to efficiently and effectively discover all forms and alterations of names for producers 105 and institutions 110 across various sources and databases. At step 215, method 200 gathers data on relationships 115 connecting producers 105 and institutions 110. For example, in some embodiments, each relationship 115 may be defined by an event involving producer 105 and institution 110. Each relationship 115 may contain information defining a year that the identifying event took place and a type of interaction that the identifying event is (e.g., an exhibition, an auction, etc.). Based on the gathered data for producers 105, institutions 110, and relationships 115, method 200 generates social network graph 100 in step 220.

At step 225, method 200 determines a hidden state value for each producer 105 and institution 110 based on relationships 115 connecting producers 105 and institutions 110 in social network graph 100. For example, each producer 105 may have an identifying attribute μ while each institution 110 may have an identifying attribute v. In some embodiments, μ and v are identification numbers that are randomly generated for each producer 105 and each institution 110, respectively. Each relationship 115 contains information of a year y and a type t identifying the year of the event and the type of the event forming the relationship 115. Referring to FIG. 1, as an example, producer 105a forms a relationship 115 with institution 110a and with institution 110b. In this scenario, producer 105a has a hidden state value μ' after a first convolution iteration according to the following equation:

$$\mu' = \mu_1 + \varphi[w'_{y\_1,t\_1} \cdot v_1 + w'_{y\_2,t\_2} \cdot v_2]$$ (Equation 1)

Wherein:
$\mu_1$ is the identifying attribute of producer 105a.
$v_1$ is the identifying attribute of institution 110a.
$v_2$ is the identifying attribute of institution 110b.
y_1 is the year of the event forming relationship 115 connecting producer 105a and 110a.
t_1 is the type of the event forming relationship 115 connecting producer 105a and 110a.
y_2 is the year of the event forming relationship 115 connecting producer 105a and 110b.
t_2 is the type of the event forming relationship 115 connecting producer 105a and 110b.
w' is a first set of weights applied to each relationship 115 formed with producer 105a in the first convolution iteration such that $w'_{y\_1,t\_1}$ is the first set of weights applied to relationship 115 connecting producer 105a and 110a and $w'_{y\_2,t\_2}$ is the first set of weights applied to relationship 115 connecting producer 105a and 110b. In some embodiments, the first set of weights w' may be a matrix assigned to each relationship 115 in social network graph 100.
$\varphi$ is a non-linear function that acts as an activation function applied to introduce nonlinearity to the first convolution iteration. It should be understood by those skilled in the art that various activation functions may be applied to introduce nonlinearity in different embodiments of the present disclosure.

The first convolution iteration described above with reference to Equation 1 allows the hidden state value μ' of producer 105a to inherit the identifying attribute $v_1$ of institution 110a and identifying attribute $v_2$ of institution 110b. It should be understood by those skilled in the art that other mathematical operations (e.g., multiplication, concatenation, etc.) may replace the use of addition in the first convolution iteration of Equation 1 in other embodiments of the present disclosure. Furthermore, it should be understood by those skilled in the art that producer 105a may form relationships 115 with additional institutions 110 and/or producers 105 in other embodiments of the present disclosure. In this scenario, additional first set of weights w' will be applied in the first convolution iteration of Equation 1 to the corresponding identifying attributes v, μ of the additional institutions 110 and/or producers 105 with a relationship 115 to producer 105a.

Referring back to step 225 in FIG. 2, hidden state values are also determined for each institution 110 to reflect the social value of institutions 110 after forming relationships 115 with producers 105. For example, referring back to the exemplary social network graph 100 shown in FIG. 1, institution 110a will have the following hidden state value $v_1'$ after inheriting the identifying attribute of producer 105a with which institution 110a forms a relationship 115:

$$v_1' = v_1 + \varphi[w'_{y\_1,t\_1} \cdot \mu_1]$$ (Equation 2)

Likewise, institution 110b will have the following hidden state value $v_2'$ after inheriting the identifying attribute of producer 105a with which institution 110b forms a relationship 115:

$$v_2' = v_2 + \varphi[w'_{y\_2,t\_2} \cdot \mu_1]$$ (Equation 3)

With the constant evolution of hidden state values for producers 105 and institutions 110 in social network graph 100, the hidden state value for producer 105a may undergo multiple convolution iterations to inherit additional changes to the social value of institutions 110 and/or producers 105 with which producer 105a has a relationship 115. In subsequent convolution iterations, first set of weights w' will be applied to the hidden state value of interacting institutions 110 and/or producers 105 rather than to the identifying attributes of interacting institutions 110 and/or producers 105. For example, producer 105a has a hidden state value μ" after a second convolution iteration according to the following equation:

$$\mu''=\mu'+\varphi[w'_{y\_1,t\_1} \cdot v_1' + w'_{y\_2,t\_2} \cdot v_2']$$ (Equation 4)

Wherein first set of weights w' are applied to the hidden state values $v_1'$ and $v_2'$ rather than the identifying attributes $v_1$ and $v_2$. It should be understood by those skilled in the art that hidden state values may undergo any number of convolution iterations within the limits of computational constraints in various embodiments of the present disclosure. Computational constraints on convolution iterations may be imposed by the computer processor executing instructions to compute hidden state values.

Figure 3:
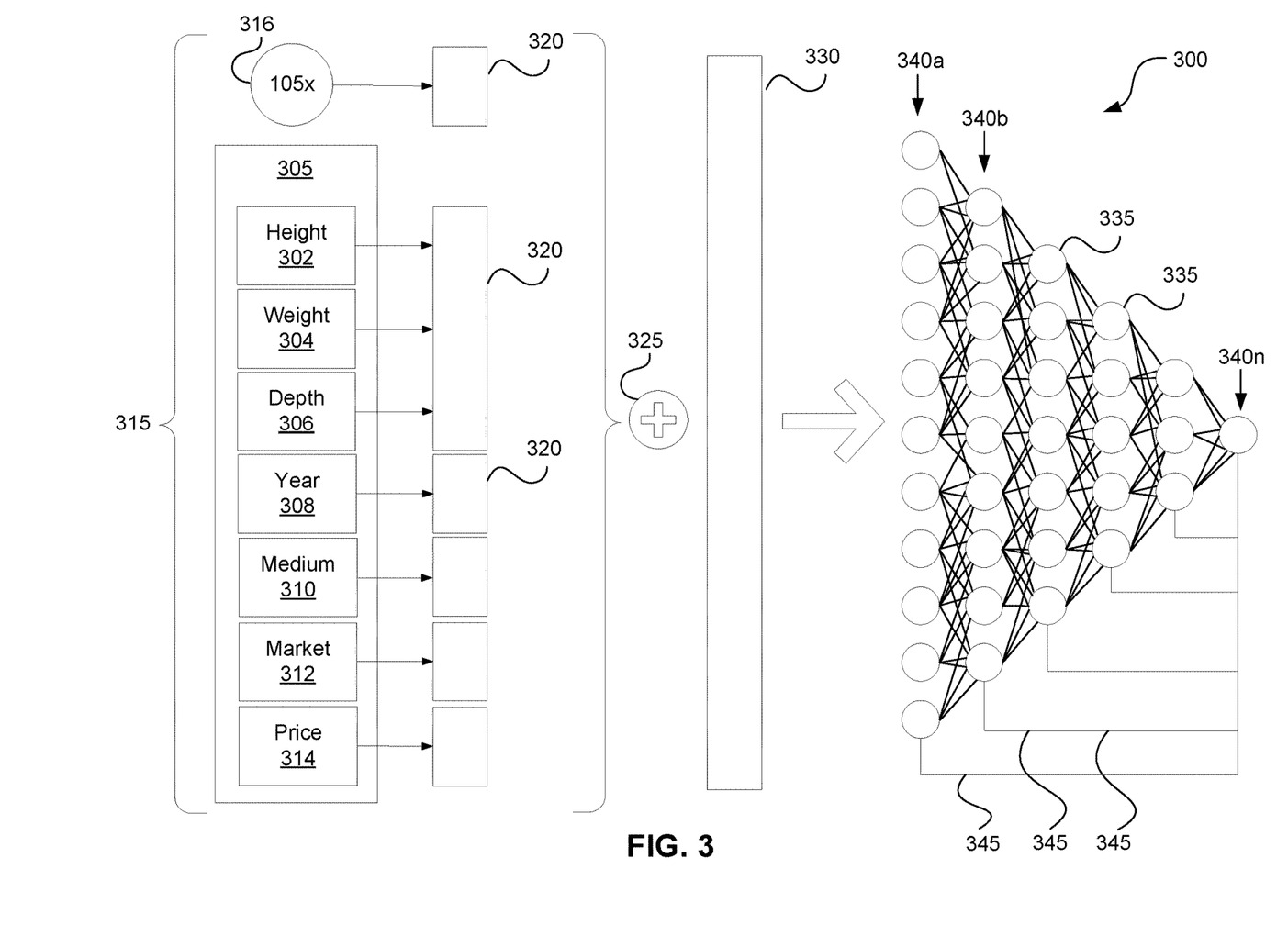
FIG. 3 shows a block diagram of a densely connected neural network using inputs to generate a price estimate for a specialty good, according to an embodiment of the present disclosure.
Figure 4:
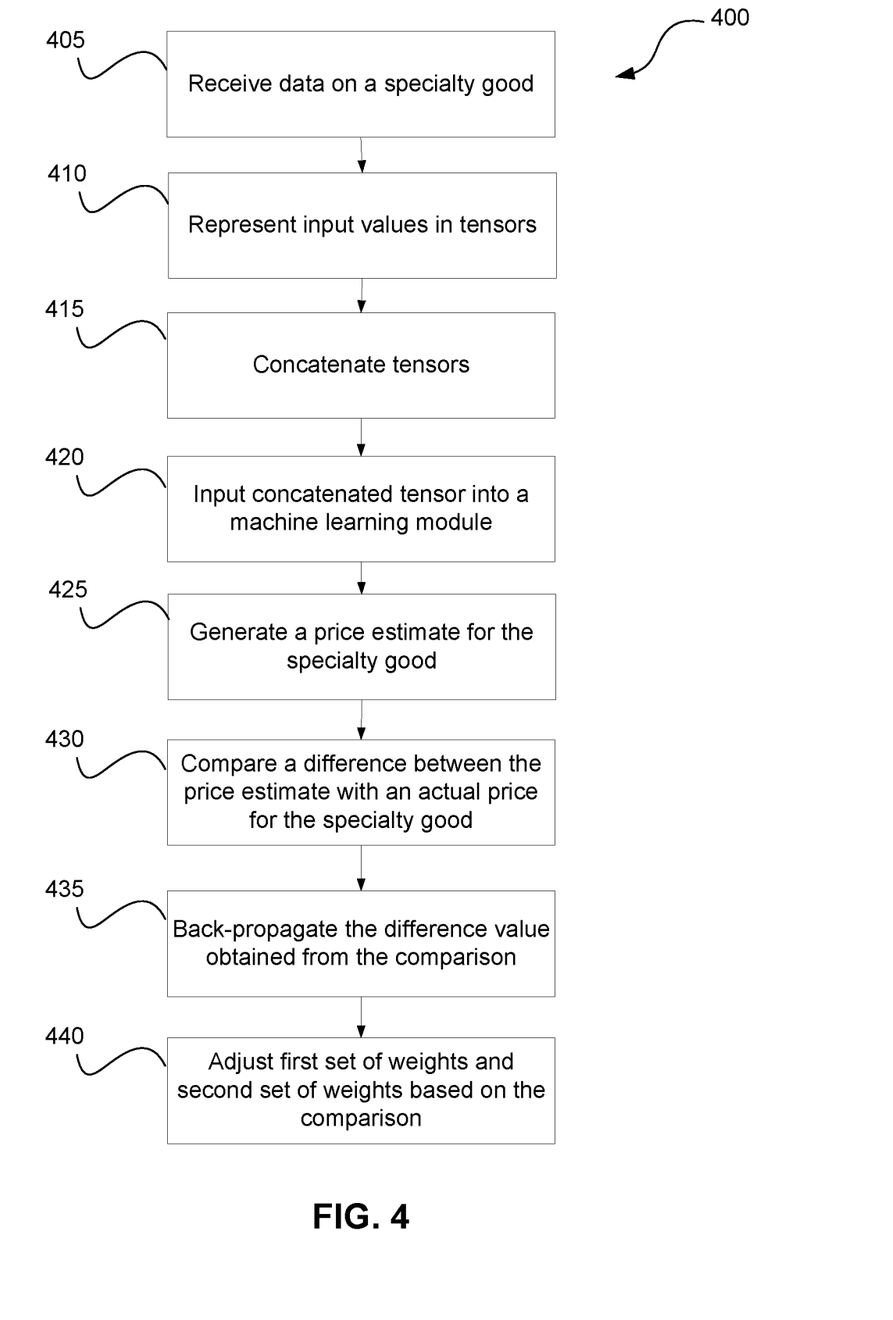
FIG. 4 shows a flowchart illustrating a method for generating the price estimate for the specialty good and training the densely connected neural network to generate more accurate price estimates for specialty goods, according to an embodiment of the present disclosure.

After hidden state values are determined for each producer 105 and each institution 110 in social network graph 100, the hidden state value of a producer 105 may be input into a densely connected neural network to determine a price estimate for a specialty good by that producer 105, even if that producer 105 does not have available prior price records for reference. An exemplary method for determining the price estimate for a specialty good by a producer 105 will now be described with reference to FIGS. 3 and 4. FIG. 3 shows a block diagram of a densely connected neural network using inputs to generate a price estimate for a specialty good, according to an embodiment of the present disclosure. FIG. 4 shows a flowchart illustrating a method 400 for generating the price estimate for the specialty good and training the densely connected neural network to generate more accurate price estimates for specialty goods, according to an embodiment of the present disclosure. Some operations of method 400 may be performed in a different order and/or vary, and method 400 may include more operations that are not described herein for simplicity.

Referring to FIG. 4, at step 405, method 400 receives data 305 describing a specialty good produced by a producer 105. As shown in the block diagram of FIG. 3, data 305 describing the specialty good may include various information about the specialty good, such as the specialty good's height 302, weight 304, depth 306, year 308, medium 310, market 312, and price 314. In some embodiments, the height 302, weight 304, depth 306, and year 308 may be represented by numbers. In some embodiments, the medium 310, market 312, and price 314 may be categorical information represented by hidden state values generated by method 200, as explained above with reference to FIG. 2. It should be understood by those skilled in the art that other information about the specialty good may also be included in data 305 in other embodiments of the present disclosure and not exhaustively described herein.

Referring to FIG. 4, at step 410, method 400 represents input values 315 as input tensors 320. In some embodiments, input values 315 may be any information inputted into a machine learning module (e.g., a densely connected neural network) and used to determine a price estimate for a specialty good by an artist based on that artist's value and/or social acclaim in a social network graph. For example, referring to the exemplary embodiment in the block diagram of FIG. 3, input values 315 are used to determine a price estimate for a specialty good by a producer 105x. In this scenario, input values 315 may include data 305 describing various aspects of the specialty good and the hidden state value 316 of producer 105x, generated by method 200 described above with reference to FIG. 2. Input values 315 are initially represented as input tensors 320, or mathematical objects used to describe physical properties (e.g., generalization of scalers and vectors). In some embodiments, some input values 315 may be grouped together and represented as one input tensor 320 while other input values 315 may be represented as individual input tensors 320. For example, as shown in the exemplary embodiment of FIG. 3, the hidden state value 316 of producer 105x, year 308, medium 310, market 312, and price 314 are represented as individual input tensors 320 while height 302, weight 304, and depth 306 are grouped together and represented as one input tensor 320. It should be understood by those skilled in the art that other grouping configurations of representing input values 315 as input tensors 320 may be used in other embodiments of the present disclosure.

Referring to FIG. 4, at step 415, method 400 performs concatenation 325 to combine input tensors 320 into a single concatenated tensor 330 (also see block diagram of FIG. 3). It should be understood that in other embodiments of the present disclosure, different mathematical operations may be performed instead of concatenation 325 to combine input tensors 320 into a single tensor 330. In step 420, method 400 inputs the concatenated tensor 330 into a machine learning module 300 to determine a price estimate of the specialty good. As shown in the block diagram of FIG. 3, machine learning module 300 may be a densely connected neural network 300 including neurons 335 organized in a number 340a-340n of layers 340. It should be understood by those skilled in the art that various embodiments of the present disclosure may include any number of layers 340a-340n in densely connected neural network 300. Neurons 335 in a first layer 340a of densely connected neural network 300 receive information contained in concatenated tensor 330 and transmit the information through subsequent layers 340 such that a price estimate of the specialty good may be generated by an output layer 340n, as explained in further detail below.

Referring to FIG. 4, at step 425, method 400 generates a price estimate for the specialty good by producer 105x and having characteristics described by data 305. As shown in the block diagram of FIG. 3, neurons 335 in the first layer 340a of densely connected neural network 300 receives input values 315 contained in concatenated tensor 330. Neurons 335 in the first layer 340a apply a second set of weights w" to input values 315 in concatenated tensor 330 before transmitting the result to neurons 335 in a second layer 340b, according to the following equation:

$$y' = \alpha[w''_1 \cdot y + b_1]$$ (Equation 5)

Wherein:

y is information contained in input values 315 of concatenated tensor 330 received by neurons 335 in the first layer 340a of densely connected neural network 300.

w" is the second set of weights applied by neurons 335 in each layer 340 of densely connected neural network 300. For example, $w''_1$ is the second set of weights applied to input values 315 in the first layer 340a of densely connected neural network 300, $w''_2$ is the second set of weights applied to input values 315 in the second layer 340b of densely connected neural network 300, and so on. In some embodiments, second set of weights w" may be a matrix assigned to each layer 340 of densely connected neural network 300.

b is a bias applied to the operation at various layers 340 of densely connected neural network 300. For example, $b_1$ is the bias applied to the operation at the first layer 340a of densely connected neural network, $b_2$ is the bias applied to the operation at the second layer 340b of densely connected neural network, and so on. In some embodiments, first set of weights w', second set of weights w", and bias b may initially be randomly assigned and later adjusted during a "training process" of method 200 and method 400, as explained in further detail below.

α is a non-linear function that acts as an activation function applied to introduce nonlinearity to Equation 1. Similar to the explanation above regarding φ, it should be understood by those skilled in the art that various activation functions may be applied to introduce nonlinearity in different embodiments of the present disclosure.

y' is the result in the first layer 340a after the second set of weights $w''_1$ is applied to input values 315 in concatenated tensor 330.

After obtaining result y' by applying the second set of weights $w''_1$ to input values 315, neurons 335 in the first layer 340a transmits result y' to neurons 335 in the second layer 340b of densely connected neural network 300, which applies the second set of weights $w''_2$ to result y' according to the following equation:

$$y'' = \alpha[w''_2 \cdot y' + b_2] \quad \text{(Equation 6)}$$

Wherein second set of weights $w''_2$ assigned to the second layer 340b of densely connected neural network 300 is applied to result y' rather than information contained in input values 315 of concatenated tensor 330 and further biased by second layer bias $b_2$. Following this pattern, neurons 335 in each successive layer 340 of densely connected neural network 300 applies the second set of weights w" to results received from the previous layer 340 such that a price estimate for the specialty good is generated by the output layer 340n after progressing through all layers 340 of densely connected neural network 300. The methods disclosed in the present disclosure are capable of training the first set of weights w' used to generate the hidden state value 316 for producer 105x and the second set of weights w" used to generate the price estimate for the specialty good, as explained in further detail below with reference to steps 430-440 of FIG. 4. Steps 430-440 of FIG. 4 discloses a "training process" that allows more accurate price estimates to be generated for specialty goods, especially when a producer 105 of a specialty good is a new artist who does not have prior price records available for reference.

Referring to FIG. 4, at step 430, method 400 begins the training process by comparing a difference between the price estimate for the specialty good generated by densely connected neural network 300 with a known, actual price that the specialty good sold for. In some embodiments, the actual price for the specialty good may be stored as price 314 in data 305 describing the specialty good. In other embodiments, method 400 include an additional step to receive the actual price for the specialty good.

In step 435, method 400 back-propagates the difference value obtained from the comparison in step 430 through each layer 340 of densely connected neural network 300. In some embodiments, step 435 of method 400 may also back-propagate the difference obtained from the comparison in step 430 through each convolution iteration in determining the hidden state value for each producer 105 and institution 110 (see step 225 of FIG. 2). In step 440, method 400 uses the difference value to adjust the second set of weights w" at each layer 340 of densely connected neural network 300 and to adjust the first set of weights w' at each convolution iteration in determining the hidden state value 316 for producer 105x such that the price estimate generated by output layer 340n more accurately reflects the actual price that the specialty good sold for. It should be understood by those skilled in the art that other methods (e.g., gradient-based learning methods) may replace the back-propagation method used in step 435 of the training process in other embodiments of the present disclosure.

In some embodiments, the hidden state value 316 of producer 105x may be determined in step 225 of FIG. 2 after a large number of convolution iterations, and the price estimate of a specialty good by producer 105x may be generated in step 425 of FIG. 4 by a deep densely connected neural network 300 including a large number of layers 340a-340n. In this scenario, the back-propagation of the difference value in step 435 may suffer a vanishing gradient problem. The vanishing gradient problem is encountered when error is compounded during back-propagation of the difference value through the large number of layers 340a-340n of a deep densely connected neural network 300 and/or through the large number of convolution iterations in determining the hidden state value 316 of producer 105x. This error prevents adequate adjustment of the first set of weights w' and the second set of weights w" to obtain more accurate price estimates for specialty goods. In order to ameliorate the vanishing gradient problem, method 400 may back-propagate the difference value obtained from the comparison in step 430 directly to each layer 340 of densely connected neural network 300. As shown in the block diagram of FIG. 3, dense module connections 345 directly connect the output layer 340n to each layer 340 of densely connected neural network 300. This allows the difference value to skip back-propagation through each layer 340 and be directly accessible by each layer 340, thereby eliminating the potential to compound error through a large number of layers 340a-340n in a deep densely connected neural network 300. Likewise, dense module connections 345 may exist (not shown) to provide the difference value directly to each convolution iteration in determining the hidden state value 316 of producer 105x, thereby eliminating the potential to compound error through a large number of convolution iterations of the hidden state value 316 of producer 105x.

Figure 5:
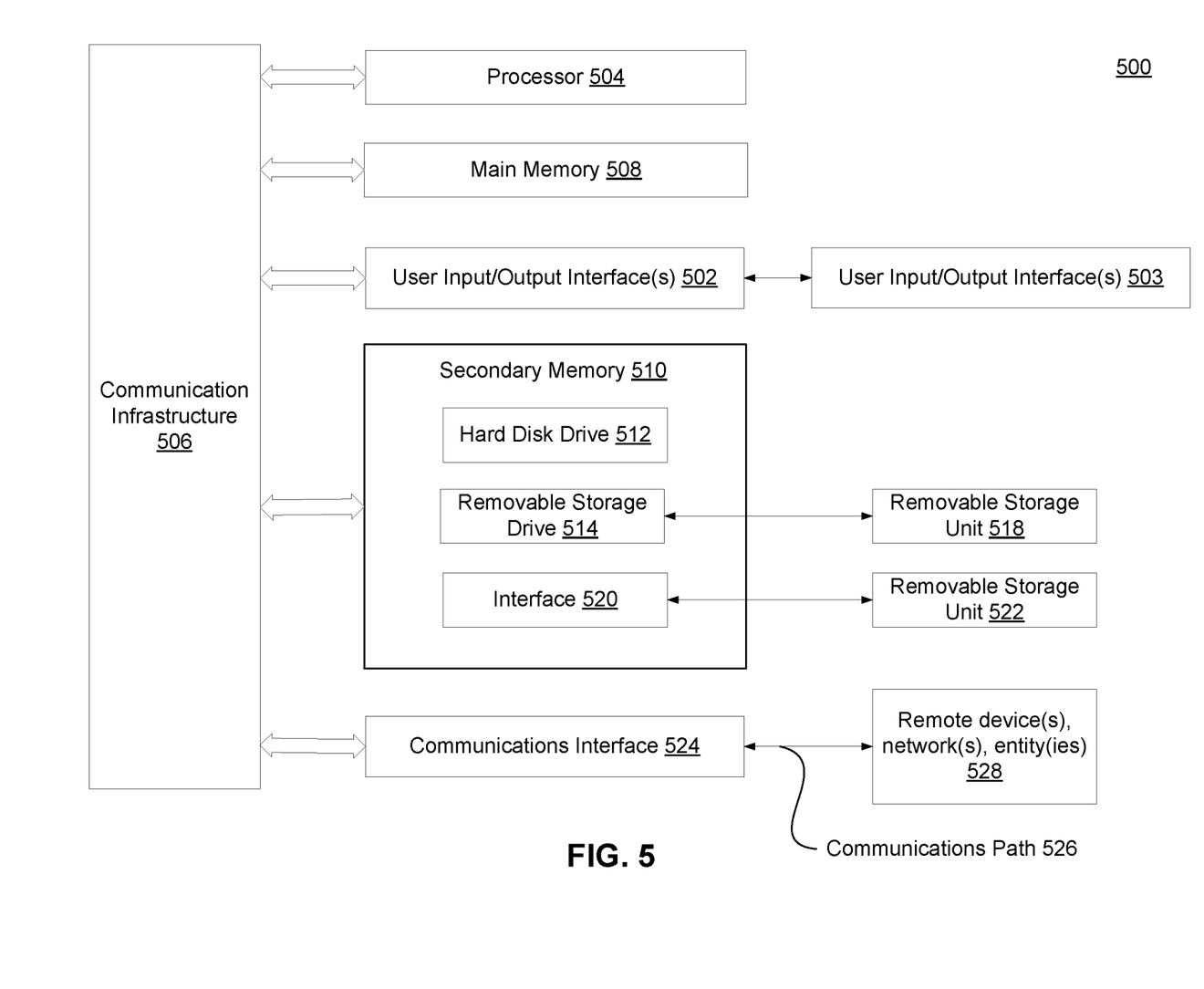
FIG. 5 illustrates an exemplary computer system capable of implementing the methods illustrated in FIGS. 2 and 4 of the present disclosure, according to one embodiment of the present disclosure.

FIG. 5 illustrates an exemplary computer system capable of implementing the method for optimizing IT system infrastructure configurations according to one embodiment of the present disclosure.

Various embodiments may be implemented, for example, using one or more well-known computer systems, such as a computer system 500, as shown in FIG. 5. One or more computer systems 500 may be used, for example, to implement any of the embodiments discussed herein, as well as combinations and sub-combinations thereof. The computer system 500 may be used to implement methods 200 and 400, generate social network graph 100, generate price estimates for specialty goods, and so on as described above with reference to FIGS. 1-4.

The computer system 500 may include one or more processors (also called central processing units, or CPUs), such as a processor 504. The processor 504 may be connected to a communication infrastructure or bus 506.

The computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer system 500 may also include a main or primary memory 508, such as random access memory (RAM). Main memory 508 may include one or more levels of cache. Main memory 508 may have stored therein control logic (i.e., computer software) and/or data.

The computer system 500 may also include one or more secondary storage devices or memory 510. The secondary memory 510 may include, for example, a hard disk drive 512 and/or a removable storage device or drive 514. The removable storage drive 514 may be a floppy disk drive, a magnetic tape drive, a compact disk drive, an optical storage device, tape backup device, and/or any other storage device/drive.

The removable storage drive 514 may interact with a removable storage unit 518. The removable storage unit 518 may include a computer usable or readable storage device having stored thereon computer software (control logic) and/or data. The removable storage unit 518 may be a floppy disk, magnetic tape, compact disk, DVD, optical storage disk, and/any other computer data storage device. The removable storage drive 514 may read from and/or write to the removable storage unit 518.

The secondary memory 510 may include other means, devices, components, instrumentalities or other approaches for allowing computer programs and/or other instructions and/or data to be accessed by the computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 500 may further include a communication or network interface 524. The communication interface 524 may enable the computer system 500 to communicate and interact with any combination of external devices, external networks, external entities, etc. (individually and collectively referenced by reference number 528). For example, the communication interface 524 may allow the computer system 500 to communicate with the external or remote devices 528 over communications path 526, which may be wired and/or wireless (or a combination thereof), and which may include any combination of LANs, WANs, the Internet, etc. Control logic and/or data may be transmitted to and from the computer system 500 via the communication path 526.

The computer system 500 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

The computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in the computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In accordance with some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, the computer system 500, the main memory 508, the secondary memory 510, and the removable storage units 518 and 522, as well as tangible articles of manufacture embodying any combination of the foregoing. Such control logic, when executed by one or more data processing devices (such as the computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

The claims in the instant application are different than those of the parent application or other related applications. The Applicant, therefore, rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method for evaluating specialty goods, comprising:
    gathering data representing a plurality of nodes and a plurality of events, each node in the plurality of nodes having at least one attribute that defines each node, each event in the plurality of events defining a relationship between two nodes in the plurality of nodes;
    generating a social network graph specifying the relationship between each node in the plurality of nodes as defined by the plurality of events;
    based on the relationship specified in the social network graph and a first set of weights, determining a hidden state value for each node of the plurality of nodes such that the hidden state value for a specific node in the plurality of nodes inherits the at least one attribute of any node in the plurality of nodes that interacts with the specific node through an event in the plurality of events;
    receiving data describing a specialty good associated with the specific node in the plurality of nodes;
    inputting the hidden state value for the specific node in the plurality of nodes and the data describing the specialty good into a machine learning module having a second set of weights;
    generating, using the machine learning module and the second set of weights, a price estimate for the specialty good,
        wherein the first set of weights and the second set of weights are configured to be trained based on an actual price for the specialty good for a plurality of specialty goods;
    comparing a difference between the price estimate generated using the machine learning module to the actual price for the specialty good; and
    training the first set of weights and the second set of weights, comprising:
        back-propagating the difference between the price estimate and the actual price through each layer of a plurality of layers in the machine learning module and through each iteration of a plurality of convolution iterations; and
        adjusting the first set of weights at each iteration of the plurality of convolution iterations and the second set of weights at each layer of the plurality of layers in the machine learning module such that the difference between the price estimate and the actual price for the specialty good is decreased.

2. The method according to claim 1, wherein determining the hidden state value for each node of the plurality of nodes further comprises:
    applying the first set of weights to the at least one attribute defining each node to determine a convolution value at each iteration of the plurality of convolution iterations.

3. The method according to claim 2, wherein inputting the hidden state value for the specific node in the plurality of nodes and the data describing the specialty good into the machine learning module further comprises:
    representing the hidden state value for the specific node and the data describing the specialty good as a plurality of tensors; and
    concatenating the plurality of tensors into an input tensor.

4. The method according to claim 3, wherein generating the price estimate for the specialty good further comprises:
    applying the second set of weights to the input tensor at each layer of the plurality of layers in the machine learning module.

5. The method according to claim 1, wherein back-propagating the difference between the price estimate and the actual price further comprises:
    decreasing a vanishing gradient by back-propagating the difference between the price estimate and the actual price directly to at least one of a specified layer in the plurality of layers in the machine learning module or a specified iteration of the plurality of convolution iterations.

6. The method according to claim 1, wherein gathering the data representing the plurality of nodes further comprises:
    using at least one of natural language processing or jaro-winkler distance analysis to aggregate data for each node of the plurality of nodes across various databases.

7. The method according to claim 6, wherein the data for each node of the plurality of nodes is at least one of an artist name or an institution name.

8. The method according to claim 7, wherein generating the social network graph further comprises at least one of:
    connecting a node of the plurality of nodes containing data of the artist name with a node of the plurality of nodes containing data of the institution name;
    connecting two nodes of the plurality of nodes that both contain data of the artist name; and
    connecting two nodes of the plurality of nodes that both contain data of the institution name.

9. A system for evaluating specialty goods, comprising:
    a memory for storing instructions;
    one or more processors, communicatively coupled to the memory, configured to execute the instructions, the instructions causing the one or more processors to:
        gather data representing a plurality of nodes and a plurality of events, each node in the plurality of nodes having at least one attribute that defines each node, each event in the plurality of events defining a relationship between two nodes in the plurality of nodes;
        generate a social network graph specifying the relationship between each node in the plurality of nodes as defined by the plurality of events;
        based on the relationship specified in the social network graph and a first set of weights, determine a hidden state value for each node of the plurality of nodes such that the hidden state value for a specific node in the plurality of nodes inherits the at least one attribute of any node in the plurality of nodes that interacts with the specific node through an event in the plurality of events;
        receive data describing a specialty good associated with the specific node in the plurality of nodes;

input the hidden state value for the specific node in the plurality of nodes and the data describing the specialty good into a machine learning module having a second set of weights;

generate using the machine learning module and the second set of weights, a price estimate for the specialty good,
wherein the first set of weights and the second set of weights are configured to be trained based on an actual price for the specialty good for a plurality of specialty goods;

compare a difference between the price estimate generated using the machine learning module to the actual price for the specialty good; and train the first set of weights and the second set of weights, comprising:
back-propagating the difference between the price estimate and the actual price through each layer of a plurality of layers in the machine learning module and through each iteration of a plurality of convolution iterations; and
adjusting the first set of weights at each iteration of the plurality of convolution iterations and the second set of weights at each layer of the plurality of layers in the machine learning module such that the difference between the price estimate and the actual price for the specialty good is decreased.

10. The system according to claim 9, wherein
the plurality of nodes includes a plurality of producers and a plurality of institutions, and
the plurality of producers are artists.

11. The system according to claim 10, wherein the social network graph comprises at least one of:
a producer of the plurality of producers connected to an institution of the plurality of institutions;
the producer of the plurality of producers connected to another producer of the plurality of producers; and
the institution of the plurality of institutions connected to another institution of the plurality of institutions.

12. The system according to claim 9, wherein the data describing the specialty good further comprises at least one of:
a height of the specialty good;
a weight of the specialty good;
a depth of the specialty good;
a year of the specialty good;
a medium of the specialty good;
a market of the specialty good; and
a price of the specialty good.

13. The system according to claim 12, wherein
the height, the weight, the depth, and the year are represented by numbers, and
the medium, the market, and the price are represented by the hidden state values.

14. The system according to claim 9, wherein the machine learning module is a densely connected neural network including a plurality of neurons organized in the plurality of layers.

15. The system according to claim 14, wherein the hidden state value for each node of the plurality of nodes is determined by
applying the first set of weights to the at least one attribute defining each node to determine a convolution value at each iteration of the plurality of convolution iterations.

16. The system according to claim 15, wherein the price estimate for the specialty good is generated by
applying the second set of weights to the hidden state value for the specific node and the data describing the specialty good at each layer of the plurality of layers in the machine learning module.

17. The system according to claim 9, wherein to back-propagate the difference between the price estimate and the actual price further comprises:
decreasing a vanishing gradient by back-propagating the difference between the price estimate and the actual price directly to at least one of a specified layer in the plurality of layers in the machine learning module or a specified iteration of the plurality of convolution iterations.

* * * * *